April 13, 1926. 1,580,140
W. G. KOUPAL
APPARATUS FOR MAKING SHEET GLASS
Filed August 12, 1925 2 Sheets-Sheet 2
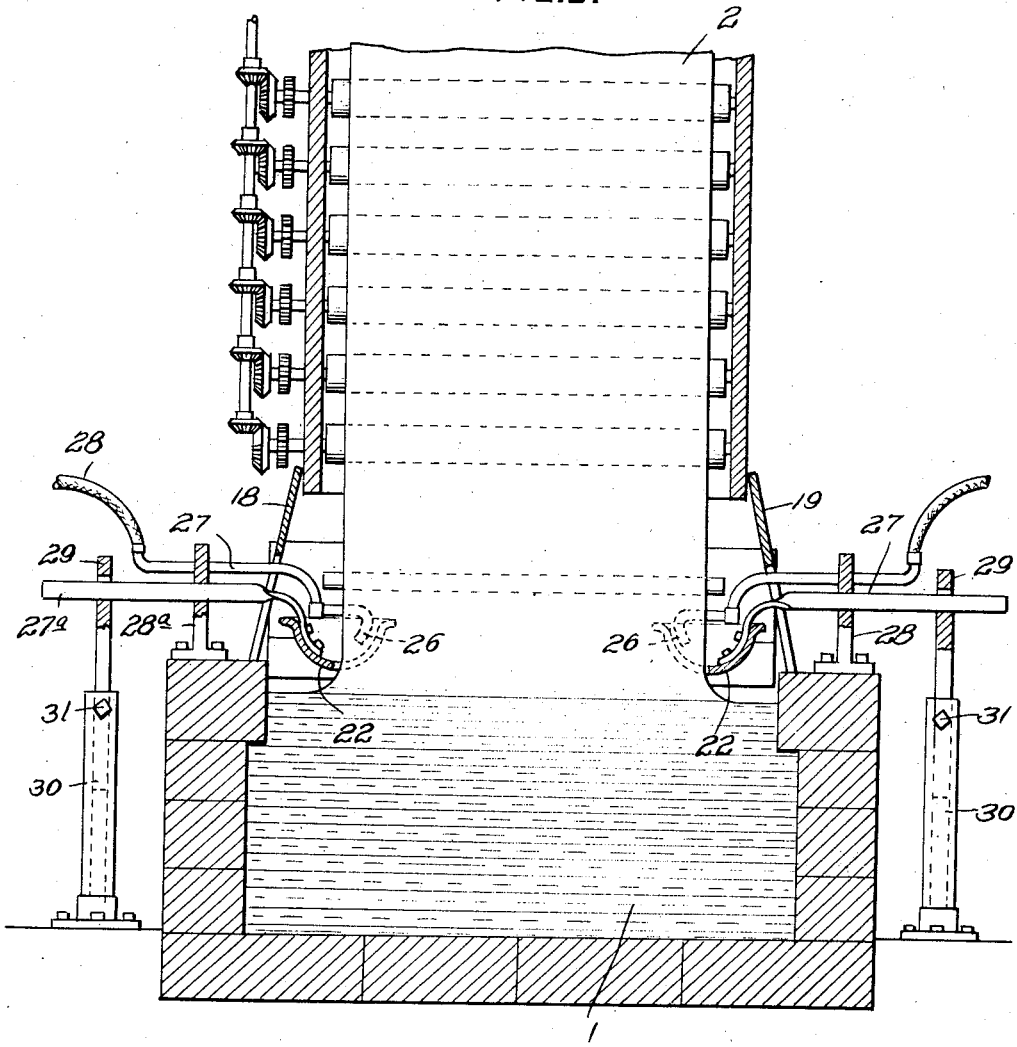
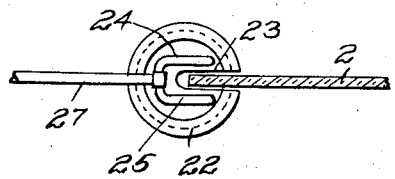
INVENTOR
Walter G. Koupal
by
James C. Bradley
Atty Patented Apr. 13, 1926.

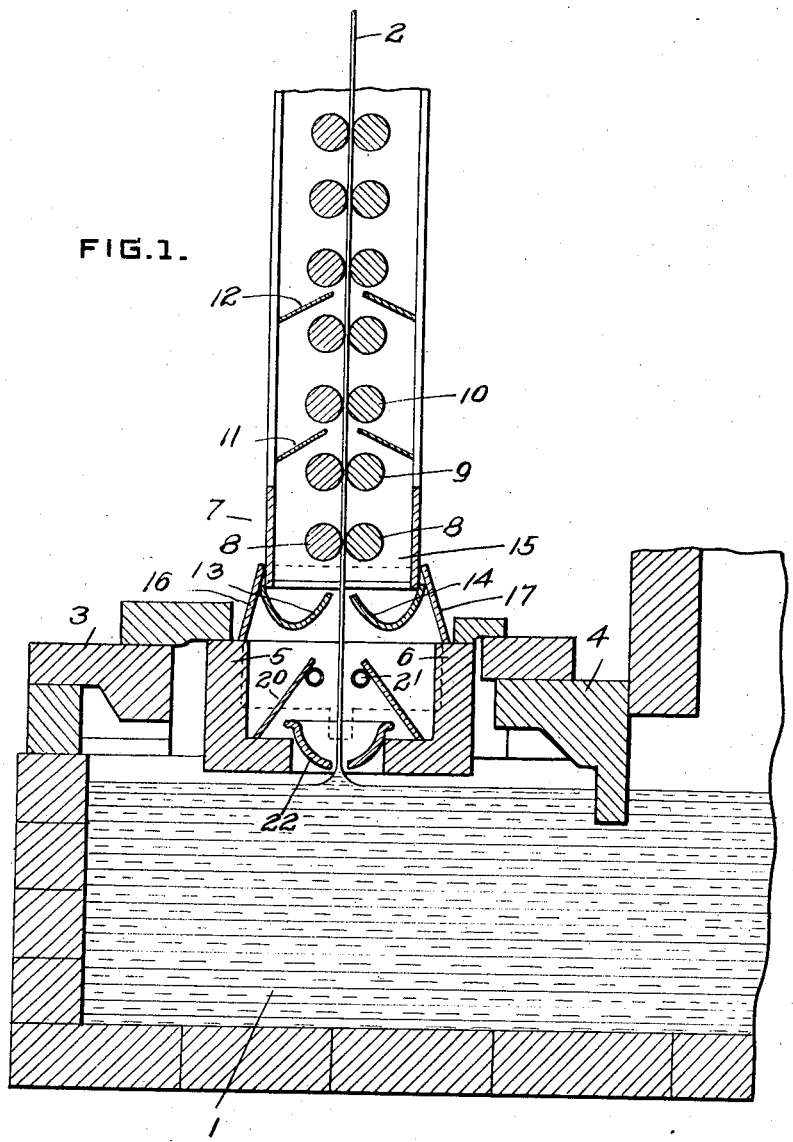

1,580,140

UNITED STATES PATENT OFFICE.

WALTER G. KOUPAL, OF MOUNT VERNON, OHIO, ASSIGNOR TO PITTSBURGH PLATE GLASS COMPANY, A CORPORATION OF PENNSYLVANIA.

APPARATUS FOR MAKING SHEET GLASS.

Application filed August 12, 1925. Serial No. 49,744.

*To all whom it may concern:*

Be it known that I, WALTER G. KOUPAL, a citizen of the United States, and a resident of Mount Vernon, in the county of Knox and State of Ohio, have made a new and useful invention in Improvements in an Apparatus for Making Sheet Glass, of which the following is a specification.

The invention relates to an apparatus for making sheet glass applicable where a continuous sheet is drawn from an open pool or bath; and involves an improvement on the Slingluff edge holding means of the type disclosed in the Slingluff Patent No. 1,549,513 of August 11, 1925. I have found that when this type of edge holding device is used over a pool surrounded by enclosing walls, which cut down the radiation of heat from the slotted plates, there is a tendency of the edges of the glass sheet to pull away from the plates, and the object of the invention is to overcome this difficulty. Briefly stated, I have found that this function may be accomplished by applying a cooling flow of air to the upper surface of the slotted plates or discs at the sides of the slots. The amount of air required is small and the pressure required is low, as only a slight amount of cooling is necessary, and such cooling should be local rather than general, so that the bodies of the plates or discs are not materially reduced in temperature, the cooling being restricted to small areas lying along the sides of the slots. Too much cooling tends to make the edges of the sheet hard and brittle, producing fire cracks and causing breakage. One embodiment of the invention is illustrated in the accompanying drawings wherein:

Figure 1 is a vertical section through the apparatus. Fig. 2 is a vertical section taken at right angles to the section of Fig. 1. And Fig. 3 is a detail plan view of one of the edge holding devices.

Referring to the drawings, 1 is a forehearth or drawing tank connected with a melting tank preferably of the regenerator type from which the glass sheet or ribbon 2 is to be drawn continuously. The surface of the bath in the forehearth is partially covered over by means of the plates 3 and 4 and the L blocks 5 and 6. Mounted above the opening between the L blocks is the leer 7 which carries the means for drawing the glass continuously upward from the bath. The means employed for drawing the glass comprises a series of pairs of rollers 8, 9, 10, etc. driven by suitable means either made up of asbestos discs or of central supporting members having an asbestos covering. The rolls lying on one side of the sheet are preferably fixed against lateral movement, while the rollers on the other side are yieldingly pressed against the sheet by means of counterweighted levers, as more fully set forth in my copending application of even date, Serial No. 49,743. Any other suitable drawing means might be employed.

The leer is divided into a series of compartments by means of the inclined baffle plates 11, 12, etc., and the temperature of these compartments decreases progressively upward so that the glass is gradually cooled and annealed as it passes through the leer, being cut into separate sheets as it emerges from the upper end of the leer. At the lower end of the leer is a pair of plates 13 and 14 of the shape indicated in Fig. 1, such plates acting as a partial closure for the compartment 15 at the bottom of the leer and also serving to catch any broken glass falling from this compartment.

The space into which the glass sheet is drawn beneath the leer is closed in by means of the end plates 16 and 17 and the side plates 18 and 19 and the glass is further shielded by means of the inclined plates 20 supported at their lower ends upon the L blocks 5 and 6 and resting at their upper ends against the transverse water cooled pipes 21.

The edge holding devices comprise the dish shaped members 22 slotted as indicated at 23 and located adjacent the surface of the bath. These members are preferably made of cast iron or cast steel and are relatively thick and heavy. In service, they become red hot and act as reflectors maintaining the areas of glass therebeneath considerably hotter than would otherwise be the case. The slots 23 are somewhat wider than the thickness of the glass and the contact between the glass and the edge of the slot is relatively slight. There is, however, sufficient adherence to prevent the edge of the sheet from working inward during the drawing operation unless the metal reaches too high a temperature, in which case, the devices will release their hold upon the edges of the sheet and permit it to narrow. This overheating will not ordinarily occur if the space between the L blocks and the lower end of the leer is not closed in, but when such space is closed in, as is done by the use of the plates 16, 17, 18 and 19, this overheating and release of the edges of the sheet occurs. This condition, as heretofore referred to, is taken care of by the use of the pair of air supply pipes 24 and 25 arranged to straddle the slot 23, as indicated in Fig. 3, and having their ends re-curved, as indicated at 26. These branch pipes 24 and 25 are supplied with air under pressure from the pipe 27 connected to a supply hose 28. The pipes 24 and 25 are of small diameter and the pressure employed is low so that there is only a gentle flow of air downward along the upper surface of the plate 22 adjacent the sides of the slot 23. This air supply chills the portion of the plate 22 which engages the edge of the glass sheet to such an extent that such edge will not pull away from the edge holding device. If too much air is supplied through the branches 24 and 25, the edge of the glass sheet is chilled to too great an extent, making such edge too hard and tending to cause breakage and give a rough edge. The plates 22 may be supported in any desired manner so that they can be adjusted to meet requirements. As illustrated, the plates are supported upon bars 27ª passing through forked supports 28ª seated upon the side walls of the furnace, the rear ends of the bars passing through adjustable rods 29 carried by the standards 30. The position of the rod 29 is fixed by means of the set screw 31. The invention is not limited to the use of a slotted plate 22 of the shape illustrated, although this form of plate located with its convex side down and closely adjacent the surface of the glass is the preferred form of construction and the one which has given the best results.

What I claim is:

1. In combination with apparatus arranged to draw a glass sheet from an open pool of molten glass, of means for preventing inward movement of the edge of the sheet in said pool, comprising a shielding plate spaced above the surface of the pool, but closely adjacent thereto and having a slot extending inward from its edge and fitting around the edge of the sheet, and means for applying a cooling flow of air to the upper surface of the plate on each side of said slot.

2. In combination with apparatus arranged to draw a glass sheet from an open pool of molten glass, of means for preventing inward movement of the edge of the sheet in said pool, comprising a shielding plate of dish shape with its convex side down spaced above the surface of the pool, but closely adjacent thereto and having a slot extending inward from its edge and fitting around the edge of the sheet, and means for applying a cooling flow of air to the upper surface of the plate at the sides of the slot.

3. In combination with apparatus arranged to draw a glass sheet from an open pool of molten glass, and closure means surrounding the space above the pool through which the sheet is drawn, of means for preventing inward movement of the edge of the sheet in said pool, comprising a shielding plate spaced above the surface of the pool, but closely adjacent thereto and having a slot extending inward from its edge and fitting around the edge of the sheet, and means for applying a cooling flow of air to the upper surface of the plate on each side of said slot.

4. In combination with apparatus arranged to draw a glass sheet from an open pool of molten glass, and closure means surrounding the space above the pool through which the sheet is drawn, of means for preventing inward movement of the edge of the sheet in said pool, comprising a shielding plate of dish shape with its convex side down spaced above the surface of the pool, but closely adjacent thereto and having a slot extending inward from its edge and fitting around the edge of the sheet, and means for applying a cooling flow of air to the upper surface of the plate on each side of said slot.

5. In combination with apparatus arranged to draw a glass sheet from an open pool of molten glass, and closure means surrounding the space above the pool through which the sheet is drawn, of means for preventing inward movement of the edge of the sheet in said pool comprising a shielding plate of dish shape, with its convex side down, spaced above the surface of the pool, but closely adjacent thereto and having a slot extending inward from its edge and fitting around the edge of the sheet, cooling means extending down into the plate adjacent the sides of the said slot, and means for supplying a cooling fluid thereto.

In testimony whereof, I have hereunto subscribed my name this 23 day of July, 1925.

WALTER G. KOUPAL.